(12) United States Patent
Ambroladze et al.

(10) Patent No.: US 9,104,583 B2
(45) Date of Patent: Aug. 11, 2015

(54) ON DEMAND ALLOCATION OF CACHE BUFFER SLOTS

(75) Inventors: Ekaterina M. Ambroladze, Fishkill, NY (US); Deanna Postles Dunn Berger, Poughkeepsie, NY (US); Michael Fee, Cold Spring, NY (US); Christine C. Jones, Poughkeepsie, NY (US); Diana Lynn Orf, Somerville, MA (US)

(73) Assignee: International Business Machines Corporation, Armonk, NY (US)

( * ) Notice: Subject to any disclaimer, the term of this patent is extended or adjusted under 35 U.S.C. 154(b) by 876 days.

(21) Appl. No.: 12/822,398

(22) Filed: Jun. 24, 2010

(65) Prior Publication Data

US 2011/0320731 A1 Dec. 29, 2011

(51) Int. Cl.
*G06F 12/08* (2006.01)

(52) U.S. Cl.
CPC ........ *G06F 12/0895* (2013.01); *G06F 12/0871* (2013.01)

(58) Field of Classification Search
CPC ............ G06F 12/0871; G06F 12/0895; G06F 2212/6046
See application file for complete search history.

(56) References Cited

U.S. PATENT DOCUMENTS

| | | | |
|---|---|---|---|
| 5,680,573 A | 10/1997 | Rubin et al. | |
| 5,875,464 A | 2/1999 | Kirk | |
| 5,893,148 A | 4/1999 | Genduso et al. | |
| 5,893,155 A | 4/1999 | Cheriton | |
| 5,907,860 A | 5/1999 | Garibay, Jr. et al. | |
| 6,038,644 A | 3/2000 | Irie et al. | |
| 6,092,154 A | 7/2000 | Curtis et al. | |
| 6,223,256 B1 | 4/2001 | Gaither | |
| 6,363,468 B1 | 3/2002 | Allison | |
| 6,421,761 B1 | 7/2002 | Arimilli et al. | |
| 6,574,223 B1 | 6/2003 | Brueckheimer et al. | |
| 6,594,728 B1 | 7/2003 | Yeager | |
| 6,747,990 B1 | 6/2004 | Umayabashi et al. | |
| 6,959,430 B2 | 10/2005 | Sokolov et al. | |
| 7,000,078 B1 | 2/2006 | Jones et al. | |
| 7,003,597 B2 | 2/2006 | Georgiou et al. | |

(Continued)

FOREIGN PATENT DOCUMENTS

| | | |
|---|---|---|
| WO | 2007099483 A2 | 9/2007 |
| WO | 2008026142 A1 | 3/2008 |

OTHER PUBLICATIONS

Chuang et al., "An On-Chip 72K Pseudo Two-Port Cache Memory Subsystem", 1990 Symposium on VLSI Circuits, 1990 Digest of Technical Papers, Jun. 1990, pp. 113-114.

(Continued)

*Primary Examiner* — Aimee Li
*Assistant Examiner* — Gary W Cygiel
(74) *Attorney, Agent, or Firm* — Cantor Colburn LLP; Margaret McNamara

(57) ABSTRACT

Dynamic allocation of cache buffer slots includes receiving a request to perform an operation that requires a storage buffer slot, the storage buffer slot residing in a level of storage. The dynamic allocation of cache buffer slots also includes determining availability of the storage buffer slot for the cache index as specified by the request. Upon determining the storage buffer slot is not available, the dynamic allocation of cache buffer slots includes evicting data stored in the storage buffer slot, and reserving the storage buffer slot for data associated with the request.

20 Claims, 5 Drawing Sheets

(56) References Cited

U.S. PATENT DOCUMENTS

| | | |
|---|---|---|
| 7,305,577 B2 | 12/2007 | Zhang |
| 2002/0002657 A1 | 1/2002 | Sturges et al. |
| 2003/0219031 A1 | 11/2003 | Gyselings et al. |
| 2005/0010723 A1* | 1/2005 | Cho et al. .................. 711/118 |
| 2005/0080874 A1 | 4/2005 | Fujiwara et al. |
| 2006/0112306 A1 | 5/2006 | Chessin et al. |
| 2007/0130237 A1 | 6/2007 | Altman et al. |
| 2007/0140020 A1 | 6/2007 | Torabi et al. |
| 2008/0071994 A1 | 3/2008 | Fields et al. |
| 2008/0294847 A1 | 11/2008 | Maruyama et al. |
| 2009/0006896 A1 | 1/2009 | Nakagawa |
| 2009/0006899 A1 | 1/2009 | Gara et al. |
| 2009/0161684 A1 | 6/2009 | Vorugati et al. |
| 2009/0216936 A1 | 8/2009 | Chu et al. |
| 2009/0240891 A1 | 9/2009 | Strait et al. |
| 2009/0282210 A1 | 11/2009 | Heyrman et al. |
| 2010/0106904 A1 | 4/2010 | Berke et al. |
| 2010/0125750 A1 | 5/2010 | Moyer et al. |
| 2010/0268984 A1 | 10/2010 | Guthrie et al. |
| 2011/0208905 A1 | 8/2011 | Shaeffer et al. |
| 2011/0320731 A1 | 12/2011 | Ambroladze et al. |
| 2011/0320732 A1 | 12/2011 | Ambroladze et al. |
| 2011/0320866 A1 | 12/2011 | Ambroladze et al. |

OTHER PUBLICATIONS

Chuang et al., "Architecture and Design of a Pseudo Two-Port VLSI Snoopy Cache Memory", Proceedings of the 1990 IEEE International Conference on Computer and Software Engineering, May 1990, pp. 400-407.

Avesta Sasan et al., A Fault Tolerant Cache Architecture for Sub 500mV Operation: Resizeable Data Composer Cache (RDC-Cache), Cases, Oct. 11-16, 2009, pp. 251-259, Grenoble, France.

* cited by examiner

ON DEMAND ALLOCATION OF CACHE BUFFER SLOTS

BACKGROUND

Exemplary embodiments relate generally to cache storage systems, and more particularly to on demand allocation of reserved cache buffer slots.

Due to continuous reductions of available on-chip area and wiring tracks, some cache designs have begun utilizing specific portions of the cache memory device as data buffer slots. While providing specific or dedicated portions of the cache memory as buffer slots offers some benefits, one drawback of this technique is that these reserved buffer slots consume space in the cache even if they have not yet been used by the operation for which they have been reserved. Consequently, the cache has fewer slots to store regular data since these reserved buffer slots are allocated without requests from the operations that need the reserved slots. These reserved buffer slots also require software to initialize the specific cache positions and mark them as reserved buffers in the directories during the initial system power on sequence.

BRIEF SUMMARY

An embodiment is a computer program product for dynamic allocation of cache buffer slots. The computer program product includes a tangible storage medium readable by a processing circuit and storing instructions for execution by the processing circuit for performing a method. The method includes receiving a request to perform an operation that requires a storage buffer slot. The storage buffer slot resides in a level of storage. The method also includes determining availability of the storage buffer slot. Upon determining the storage buffer slot is not available, the method includes evicting data stored in the storage buffer slot, and reserving the storage buffer slot for data associated with the request.

An embodiment also includes a system for dynamic allocation of cache buffer slots. The system includes a central processor. The system also includes cache management logic and castout logic configured for execution on the central processor. In response to receiving a request to perform an operation that requires a storage buffer slot, which resides in a level of storage, the cache management logic is configured to determine availability of the storage buffer slot. In response to determining the storage buffer slot is not available, the castout logic is configured to evict data stored in the storage buffer slot and reserve the storage buffer slot for the data associated with the request.

A computer-implemented method for dynamic allocation of cache buffer slots. The method includes receiving a request to perform an operation that requires a storage buffer slot. The storage buffer slot resides in a level of storage. The method also includes determining availability of the storage buffer slot. Upon determining the storage buffer slot is not available, the method includes evicting data stored in the storage buffer slot, and reserving the storage buffer slot for data associated with the request.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Exemplary embodiments provide a mechanism for allocating reserved cache buffer slots on demand. In an exemplary embodiment, buffer slots are initially configured for performing data storage pursuant to default methods and, upon a request by an operation to utilize a cache buffer slot, cache management controls pause the requested operation, dynamically create the reserved buffer slot, and then permit the operation to proceed and utilize the slot. This allows the cache to use those slots for normal data storage until such an operation arrives requests the usage of that space as a buffer.

Figure 1:
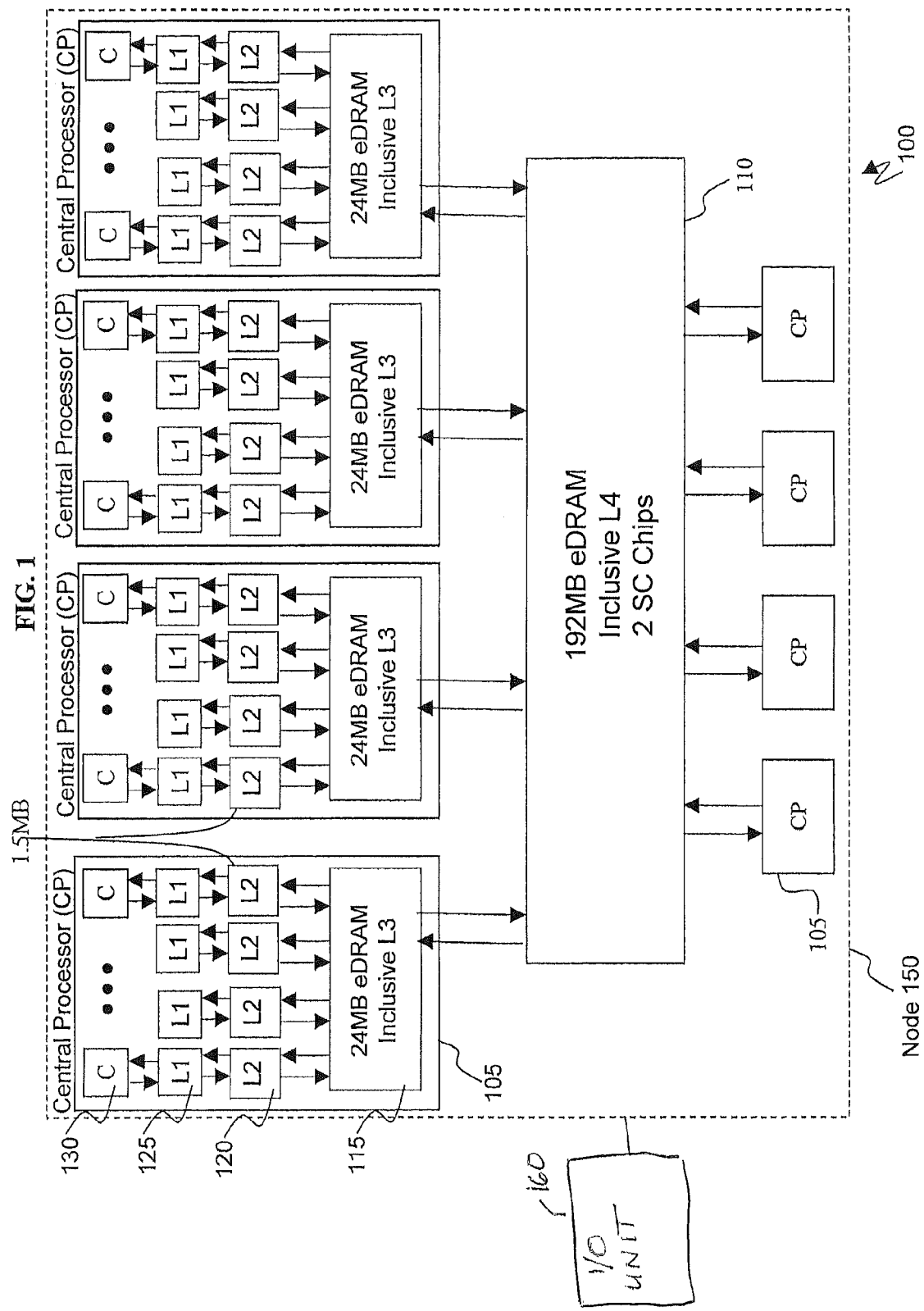
FIG. 1 depicts a system including a cache topology upon which cache management controls may be implemented in an exemplary embodiment.

Turning now to FIG. 1, a system 100 (including cache topology) for implementing the cache management controls will now be described in an exemplary embodiment. The system of FIG. 1 illustrates a plurality of central processors (CP) 105 (also referred to as central processing units) operatively connected via busses to one or more L4 caches 110. Although not shown in FIG. 1, each of the central processors (CP) 105 includes one or more cores 130 which perform the reading and executing of instructions. On each central processor (CP) 105, the multiple cores 130 are operatively connected via busses to L1, L2, and L3 caches 125, 120, and 115. The L1 caches 125 are physically closest to the cores 130, followed by the L2 caches 120, and then the L3 caches 115. It is understood that the designation of caches could be reversed.

Figure 2:
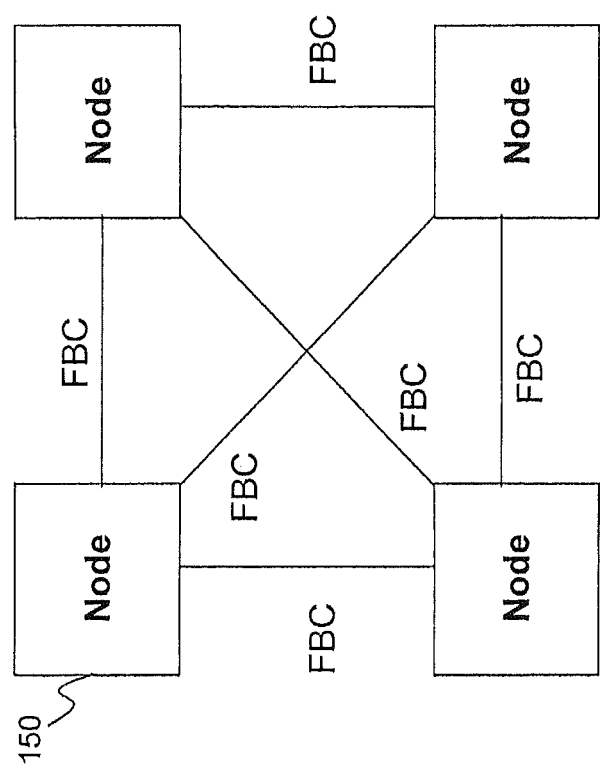
FIG. 2 depicts an example of a node-to-node fabric topology that may be used in implementing cache management controls in accordance with an exemplary embodiment.

Also shown in the system 100 is an L4 cache 110. The L4 cache 110 is operatively coupled to the CPs 105 and provides a shared memory space for each of the CPs 105. Although the L3 and L4 caches 115 and 110 are illustrated in FIG. 1 as embedded dynamic random access memory (DRAM), which is referred to as eDRAM, it will be understood by a skilled artisan that any other types of suitable memory may be utilized in realizing the exemplary embodiments. The central processors 105 operatively connected to one or more L4 caches 110 collectively form a node 150. In a computing system, multiple such nodes 150 may be operatively connected to one another for communicating, such as broadcasts, snooping, cache intervention, and responses. FIG. 2 illustrates an example of multiple nodes 150 operatively connected to one another via, e.g., one or more point-to-point buses, referred to herein as a system fabric.

The system 100 is communicatively coupled to an input/output (I/O) unit 160. The I/O unit 160 may include, e.g., an I/O hub, adapters, and interface elements for performing various operations in connection with the central processors 105.

The system 100 further includes various components for implementing the cache management controls described herein. These various components are described further in FIG. 3.

Each individual central processor 105 is fabricated on its own separate chip, which includes the L1, L2, and L3 caches 125, 120, and 115, while the L4 cache 110 is fabricated on its own separate chip. As understood by a skilled artisan, fabrication of chips including integrated circuits, wires, metal layers, semiconductor (and/or other material) components, etc., may be formed via lithography and other techniques. The fabrication process may include various deposition techniques including physical vapor deposition (PVD), chemical vapor deposition (CVD), electrochemical deposition (ECD), molecular beam epitaxy (MBE), and atomic layer deposition (ALD) among others.

Figure 3:
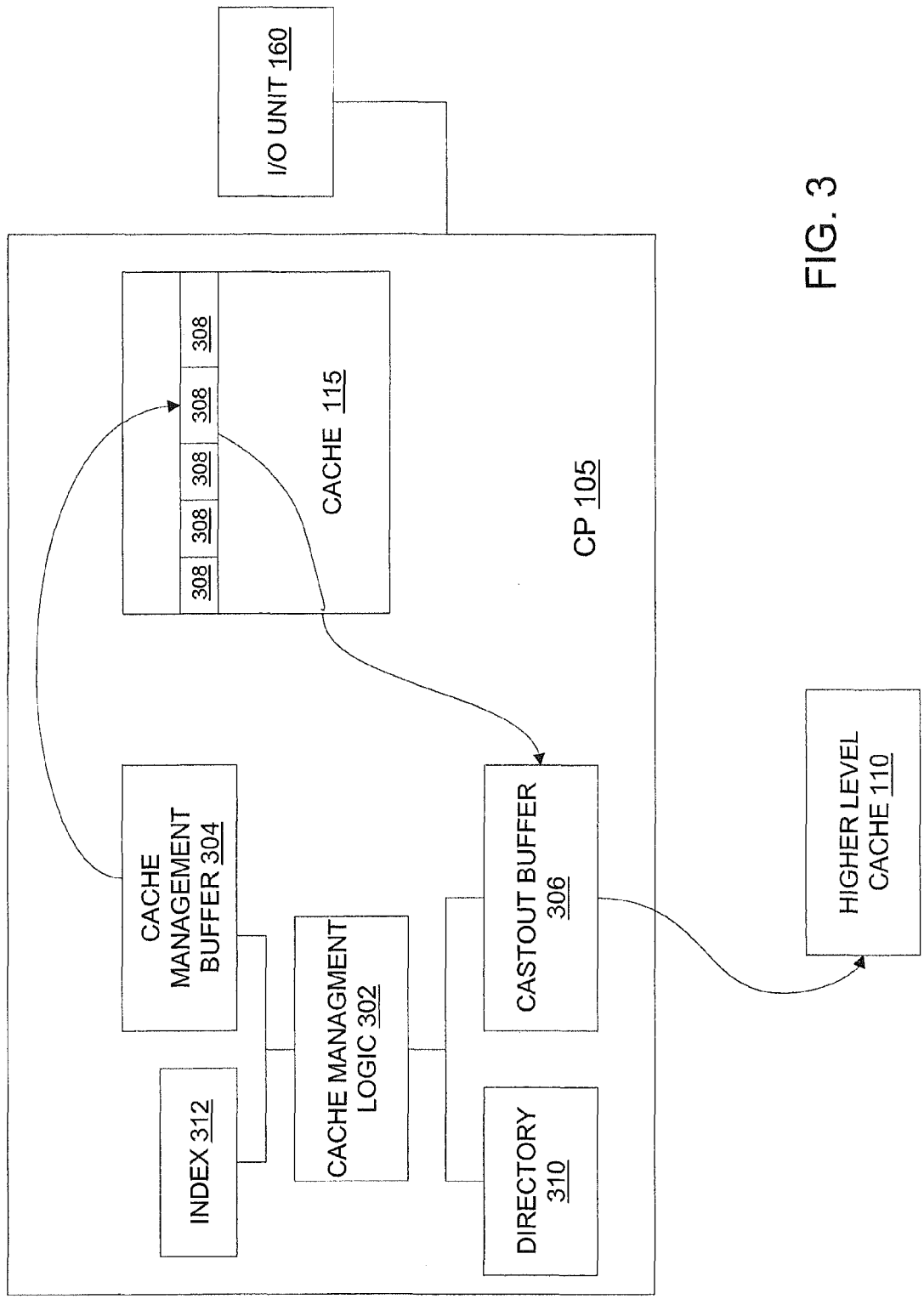
FIG. 3 depicts a detailed portion of the system of FIG. 1 upon which cache management controls may be implemented in an exemplary embodiment.

Turning now to FIG. 3, a detailed portion of the system 100 of FIG. 1 will now be described in an exemplary embodiment. As shown in FIG. 3 each central processor 105 may include cache management logic 302 in communication with a cache management buffer 304, a castout buffer 306, a directory 310, and an index 312. In an alternative embodiment, these components 302, 304, 306, 310, and 312 may reside in other locations of system 100, such as cache 110 or other cache systems. The cache 115 includes buffer slots 308, which may be reserved upon request as described further herein. The cache management logic 302 is implemented by the central processor 105 for performing the exemplary cache management controls. The functionality of the cache management buffer 304, castout buffer 306, directory 310, and index 312 is described further in FIG. 4.

Figure 4:
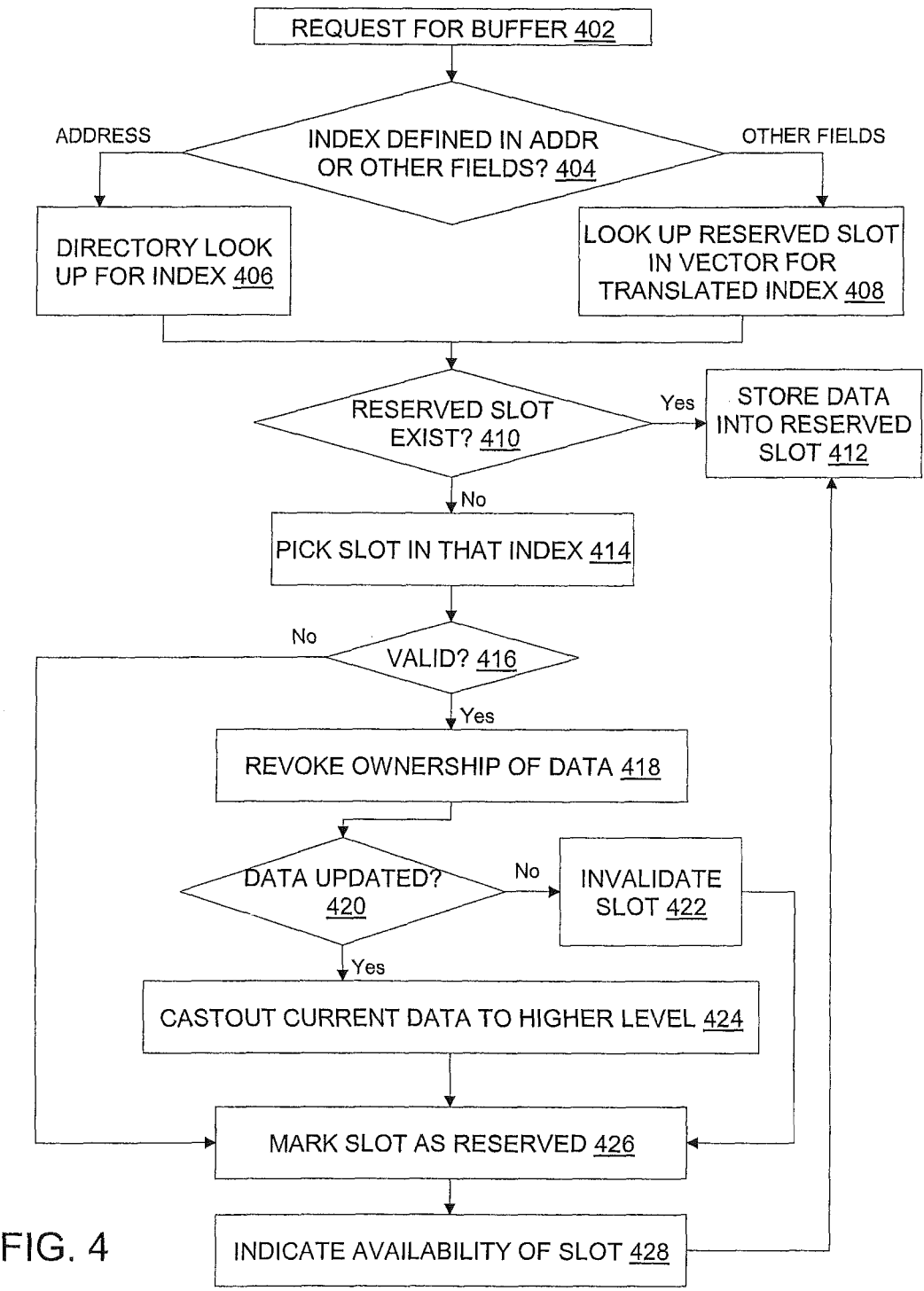
FIG. 4 is a flow diagram describing a process for implementing cache management controls in an exemplary embodiment.
Figure 5:
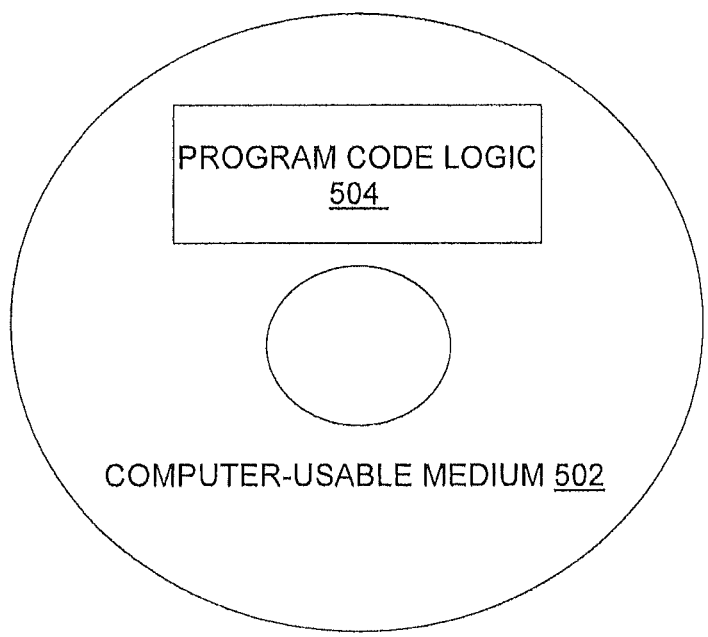
FIG. 5 is a computer program product in an exemplary embodiment.

Turning now to FIG. 4 an exemplary process for implementing cache management controls will now be described in an exemplary embodiment. For illustrative purposes, the process described in FIG. 3 uses operations from an I/O unit (e.g., anything that is external to the cache logic, such as pins), such as I/O unit 160 of FIG. 1, and an I/O buffer slot (e.g., one or more of slots 308) is used for reservation.

At block 402, an external port request for a buffer is received by the cache management logic 302. For example, the I/O unit 160 sends an operation to the central processor 105 that requires a storage buffer slot.

At block 404, the cache management logic 302 determines if the index is defined in the address or other fields. The index 312 is typically part of the address that is used to determine where in the cache the data could reside. Because cache structures are grids, when an operation requests data, it provides the address for this data. Part of that address is used to look up where in the cache this data might be. Because it is only a part of the address, not all data can be inside the cache, since it is small and only a small subset of data is inside the cache and is represented by each index. In other implementations, the index may be defined in other fields rather than the address field. For example, the cache management logic 302 checks to see if the slot having the associated address index has already been created in the cache 115. Alternatively, if the address is not readily available, the information may also be obtained by keeping track, via registers inside the cache management logic 302 for which addresses slots have been created. Addresses to index in the cache 115 can be created by decoding each I/O queue (not shown) into a unique address index, e.g., using other information provided with the operation such as source, target, type, etc.

If the index 312 is defined in the address at block 404, then a directory 310 look up for that index 312 is performed to determine if a reserved slot is available and the process proceeds to block 410. For example, if the address index 312 is available from the operation (i.e., embedded in the address fields), then a directory 310 look up to see if the state of the indexed slot is I/O reserved is a fast and inexpensive way to check availability of the slot.

If the index 312 is defined in another field at block 404, then availability of the reserved slot is looked up in a vector for each translated index at block 408, and the process proceeds to block 410. The translated index is similar to an address index, except instead of taking bits from the address, it is arranging bits from other fields.

The cache management logic 302 determines if a reserved slot exists for the provided index 312 at block 410. If so, the data is stored into the reserved slot at block 412.

If a reserved slot does not exist for the provided index 312 at block 410, the cache management logic 302 picks a slot (one of slots 308) in that index 312 at block 414. For example, when cache 115 does not contain the I/O reserved buffer slot, the address index 312 that is provided by the I/O unit 160 is used to pick a slot and load castout logic. The castout logic (not shown) is provided with address index 312 and slot.

The castout logic checks if the selected slot is currently valid at block 416. If there is no valid data in the selected slot, then the castout logic marks the slot as I/O reserved at block 426.

If there is valid data in the selected slot at block 416, the castout logic requests lower-level caches to revoke the ownership of the data at block 418. At block 420, it is determined whether the data has been updated. If not, the castout logic 302 invalidates the slot at block 422. If the data has been updated at block 420, and once the lower level caches have rescinded ownership of the data, the castout logic casts out the data to a higher level cache (e.g., L4 cache 110) at block 424.

Once the data has been moved or invalidated, or alternatively, if the data is invalid (from block 416) as described above, the castout logic updates the status of the slot to being reserved for I/O at block 426. Once the castout logic is done, this signals to the cache management logic 302 that the slot has been created and the I/O data can be stored there at block 428. Next time the I/O unit 160 sends an operation that requires a storage buffer slot, the cache management logic 302 will see the created I/O reserved slot and allow the I/O to proceed to interact with it. The process returns to block 412, whereby the data is stored in the reserved slot.

Technical effects include allocating reserved cache buffer slots on demand. The buffer slots are initially configured for performing data storage pursuant to default methods and, upon a request by an operation to utilize a cache buffer slot, cache management controls pause the requested operation, dynamically create the reserved buffer slot, and then permits the operation to proceed and utilize the slot. This allows the cache to use those slots for normal data storage until such an operation arrives requests the usage of that space as a buffer.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product 500 embodied in one or more computer readable medium(s) 502 having computer readable program code embodied thereon 504.

Any combination of one or more computer readable medium(s) may be utilized. The computer readable medium may be a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for dynamic allocation of reserved buffer slots, comprising a non-transitory tangible storage medium readable by a processing circuit and storing instructions for execution by the processing circuit for performing a method comprising:

receiving a request by a cache management logic to perform an operation that requires a reserved buffer slot that is reserved for data associated with the operation, the reserved buffer slot residing in a cache;

determining whether an index of the request is defined in an address of the request or in another field of the request;

based on determining that the index of the request is defined in the address of the request, determining availability of the reserved buffer slot based on looking up the index in a directory of the cache;

based on determining that the index of the request is defined in another field of the request:

generating a translated index using the another field, the another field comprising at least one of a source of the operation, a target of the operation, and a type of the operation, the generating being performed based on an input/output (I/O) queue of the request; and determining availability of the slot based on looking up the translated index in a vector for the translated index;

based on determining the reserved buffer slot is not available, selecting a cache buffer slot in the cache, the cache buffer slot having an address index corresponding to the index of the request; and reserving the cache buffer slot as the reserved buffer slot for data associated with the request by updating a status of the cache buffer slot to reserved in a directory of the cache.

2. The computer program product of claim 1, the method further comprising:

storing the data associated with the request in the reserved buffer slot based on reserving the cache buffer slot as the reserved buffer slot.

3. The computer program product of claim 1, wherein determining availability of the reserved buffer slot further comprises determining whether the reserved buffer slot has already been created in the cache.

4. The computer program product of claim 1, wherein the determining availability of the reserved buffer slot further comprises:

tracking, via registers in a the cache management logic, for which addresses reserved buffer slots have already been created in the cache; and determining, based on the registers and the index of the request, whether the reserved buffer slot is available for the request.

5. The computer program product of claim 1, the method further comprising performing, in response to determining that the reserved buffer slot is not available:

determining whether data in the selected cache buffer slot is valid;

based on determining the data in the selected cache buffer slot is valid, revoking ownership by a lower-level cache of the data in the selected cache buffer slot;

determining whether the data has been updated; and based on determining that the data has not been updated, invalidating the selected cache buffer slot.

6. The computer program product of claim 5, the cache comprising one of a level one (L1) cache, a level 2 (L2) cache, and a level 3 (L3) cache, and wherein the method further comprises:

based on determining that the data has been updated, evicting the data stored in the selected cache buffer slot to a higher-level cache comprising a level four (L4) cache that is closer to system memory than the cache, the L4 cache being distinct from the system memory, and being located on a separate chip from the cache.

7. The computer program product of claim 1, the method further comprising:

based on determining the reserved buffer slot is available, storing data associated with the request in the reserved buffer slot.

8. A system for dynamic allocation of reserved buffer slots, the system comprising:

a central processor; and cache management logic and castout logic configured for execution on the central processor, and further configured to:

receive a request to perform an operation by the cache management logic that requires a reserved buffer slot that is reserved for data associated with the operation, the reserved buffer slot residing in a cache;

determine whether an index of the request is defined in an address of the request or in another field of the request;

based on determining that the index of the request is defined in the address of the request, determine availability of the reserved buffer slot based on looking up the index in a directory of the cache;

based on determining that the index of the request is defined in another field of the request:

generating a translated index using the another field, the another field comprising at least one of a source of the operation, a target of the operation, and a type of the operation, the generating being performed based on an input/output (I/O) queue of the request; and determining availability of the slot based on looking up the translated index in a vector for the translated index; and based on determining the storage buffer slot is not available, select a cache buffer slot in the cache by the castout logic, the cache buffer slot having an address index corresponding to the index of the request; and reserve the cache buffer slot as the reserved buffer slot for data associated with the request by updating a status of the cache buffer slot to reserved in a directory of the cache.

9. The system of claim 8, the castout logic configured to further implement:

storing the data associated with the request in the reserved buffer slot based on reserving the cache buffer slot as the reserved buffer slot.

10. The system of claim 8, wherein determining availability of the reserved buffer slot further comprises determining whether the reserved buffer slot has already been created in the cache.

11. The system of claim 8, wherein determining availability of the reserved buffer slot further comprises:

tracking, via registers in the cache management logic, for which addresses reserved buffer slots have already been created in the cache; and determining, based on the registers and the index of the request, whether the reserved buffer slot is available for the request.

12. The system of claim 8, further comprising, in response to determining that the reserved buffer slot is not available, the castout logic is further configured to implement:

determining whether data in the selected cache buffer slot is valid;

based on determining the data in the selected cache buffer slot is valid, revoking ownership by a lower-level cache of the data in the selected cache buffer slot;

determining whether the data has been updated; and based on determining that the data has not been updated, invalidating the selected cache buffer slot.

13. The system of claim 12, wherein the cache comprises one of a level one (L1) cache, a level 2 (L2) cache, and a level 3 (L3) cache, and the castout logic is further configured to implement:

based on determining that the data has been updated, evicting the data stored in the selected cache buffer slot to a higher-level cache comprising a level four (L4) cache that is closer to system memory than the cache, the L4 cache being distinct from the system memory, and being located on a separate chip from the cache.

14. A computer-implemented method for dynamic allocation of reserved buffer slots, the method comprising:

receiving a request by a cache management logic to perform an operation that requires a reserved buffer slot that is reserved for data associated with the operation, the reserved buffer slot residing in a cache;

determining whether an index of the request is defined in an address of the request or in another field of the request;

based on determining that the index of the request is defined in the address of the request, determining availability of the reserved buffer slot based on looking up the index in a directory of the cache;

based on determining that the index of the request is defined in another field of the request:
  generating a translated index using the another field, the another field comprising at least one of a source of the operation, a target of the operation, and a type of the operation, the generating being performed based on an input/output (I/O) queue of the request; and
  determining availability of the slot based on looking up the translated index in a vector for the translated index;

based on determining the reserved buffer slot is not available, selecting a cache buffer slot in the cache, the cache buffer slot having an address index corresponding to the index of the request; and reserving the cache buffer slot as the reserved buffer slot for data associated with the request by updating a status of the cache buffer slot to reserved in a directory of the cache.

15. The computer-implemented method of claim 14, the method further comprising:
  storing the data associated with the request in the reserved buffer slot based on reserving the cache buffer slot as the reserved buffer slot.

16. The computer-implemented method of claim 14, wherein determining availability of the reserved buffer slot further comprises determining whether the reserved buffer slot has already been created in the cache.

17. The computer-implemented method of claim 14, wherein determining availability of the reserved buffer slot further comprises:
  tracking, via registers in the cache management logic, for which addresses reserved buffer slots have already been created in the cache; and
  determining, based on the registers and the index of the request, whether the reserved buffer slot is available for the request.

18. The computer-implemented method of claim 14, the method further comprising performing, in response to determining that the reserved buffer slot is not available:
  determining whether data in the selected cache buffer slot is valid; based on determining the data in the selected cache buffer slot is valid, revoking ownership by a lower-level cache of the data in the selected cache buffer slot;
  determining whether the data has been updated; and
  based on determining that the data has not been updated, invalidating the selected cache buffer slot.

19. The computer-implemented method of claim 18, wherein the cache comprises one of a level one (L1) cache, a level 2 (L2) cache, and a level 3 (L3) cache, and wherein the method further comprises:
  based on determining that the data has been updated, evicting the data stored in the selected cache buffer slot to a higher-level cache comprising a level four (L4) cache that is closer to system memory than the cache, the L4 cache being distinct from the system memory, and being located on a separate chip from the cache.

20. The computer-implemented method of claim 14, the method further comprising:
  based on determining the reserved buffer slot is available, storing data associated with the request in the reserved buffer slot.

* * * * *